United States Patent
Sankaran et al.

(10) Patent No.: US 10,063,487 B2
(45) Date of Patent: Aug. 28, 2018

(54) PATTERN MATCHING VALUES OF A PACKET WHICH MAY RESULT IN FALSE-POSITIVE MATCHES

(71) Applicants: Ganesh Chennimalai Sankaran, Tamil Nadu (IN); Rambabu Katta, Tamil Nadu (IN)

(72) Inventors: Ganesh Chennimalai Sankaran, Tamil Nadu (IN); Rambabu Katta, Tamil Nadu (IN)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 14/622,876

(22) Filed: Feb. 15, 2015

(65) Prior Publication Data
US 2016/0191388 A1 Jun. 30, 2016

(30) Foreign Application Priority Data
Dec. 30, 2014 (IN) .......................... 6729/CHE/2014

(51) Int. Cl.
*H04L 12/851* (2013.01)
*G06F 17/00* (2006.01)
(Continued)

(52) U.S. Cl.
CPC .... *H04L 47/2483* (2013.01); *G06F 17/30949* (2013.01); *H04L 45/7453* (2013.01)

(58) Field of Classification Search
CPC .................. H04L 47/2483; H04L 45/7453
See application file for complete search history.

(56) References Cited

U.S. PATENT DOCUMENTS 7,308,446 B1    12/2007  Panigrahy et al.
7,689,530 B1    3/2010   Williams, Jr. et al.
(Continued)

OTHER PUBLICATIONS

Song et al., "Snort offloader: a reconfigurable hardware NIDS filter," 2005, http://www.arl.wustl.edu/~hs1/publication/snort-offloader.pdf, Washington University, St. Louis, MO (six pages).
(Continued)

*Primary Examiner* — Omer S Mian
(74) *Attorney, Agent, or Firm* — The Law Office of Kirk D. Williams

(57) ABSTRACT

In one embodiment, a packet switching device determines that a packet matches one of a plurality of predetermined patterns, however, this matching may produce a false-positive match of one of the underlying rules corresponding to the plurality of predetermined patterns. In one embodiment, determining the packet matches one of the plurality of predetermined patterns includes determining a first pattern match of a packet when each particular portion of a plurality of different portions of the packet is found to be matching a corresponding particular pattern portion by performing a table lookup operation based on the particular portion as an address in a corresponding different current portion-iteration table to retrieve a corresponding partial result. In one embodiment, the first pattern match is filtered using a second validation technique for removing false-positive first pattern matches. In one embodiment, the second validation technique includes using hashing.

14 Claims, 4 Drawing Sheets

(51) Int. Cl.
  *H04L 12/743* (2013.01)
  *G06F 17/30* (2006.01)

(56) References Cited

U.S. PATENT DOCUMENTS

| | | | | |
|---|---|---|---|---|
| 9,021,266 B2* | 4/2015 | Kim | ............... | H04L 9/0643 |
| | | | | 713/176 |
| 2006/0184556 A1* | 8/2006 | Tan | ............... | G06F 17/30949 |
| 2006/0193159 A1* | 8/2006 | Tan | ............... | G06F 17/30949 |
| | | | | 365/49.16 |
| 2008/0133583 A1* | 6/2008 | Artan | ............ | H04L 63/1416 |
| 2014/0195545 A1* | 7/2014 | Anand | ........... | H04L 45/7453 |
| | | | | 707/747 |
| 2015/0074792 A1* | 3/2015 | Tarreau | ......... | H04L 63/0227 |
| | | | | 726/13 |
| 2015/0172159 A1* | 6/2015 | Ficara | ........... | H04L 63/1408 |
| | | | | 706/46 |

OTHER PUBLICATIONS

Tuck et al., "Deterministic Memory-Efficient String Matching Algorithms for Intrusion Detection," 2004, Proceedings of IEEE Infocom, IEEE Society, Piscataway, NJ (twelve pages).

* cited by examiner

PATTERN MATCHING VALUES OF A PACKET WHICH MAY RESULT IN FALSE-POSITIVE MATCHES

TECHNICAL FIELD

The present disclosure relates generally to processing packets in a communications network, including, but not limited to, performing packet characterization by a packet switching device using pattern matching values of a packet which may result in false-positive matches.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
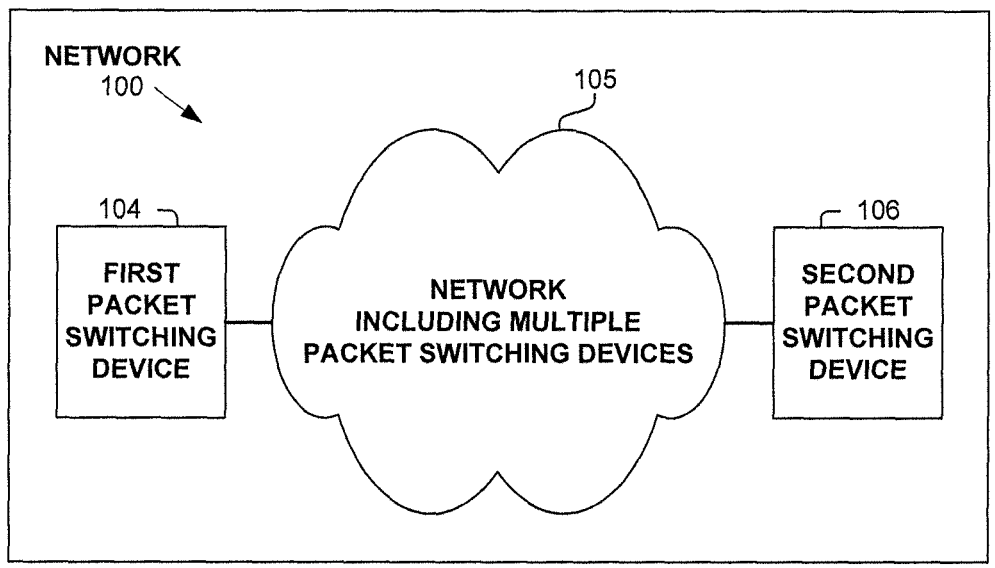
FIG. 1 illustrates a network operating according to one embodiment.

Disclosed are, inter alia, methods, apparatus, computer-storage media, mechanisms, and means associated with pattern matching values of a packet which may result in a false-positive match. One embodiment includes a method, comprising: determining, by a packet switching device, a packet matches one of a plurality of predetermined patterns which allow for false-positive matching indications of a plurality of underlying rules corresponding to the plurality of predetermined patterns. In one embodiment, said determining the packet matches one of the plurality of predetermined patterns includes determining a first pattern match of a packet when each particular portion of a plurality of different portions of the packet is found to be matching a corresponding particular pattern portion by performing a table lookup operation based on the particular portion as an address in a corresponding different current portion-iteration table to retrieve a corresponding partial result.

One embodiment includes filtering the first pattern match using a second validation technique for removing false-positive first pattern matches to produce a false-positive filtered pattern match. In one embodiment, the second validation technique includes producing a hash key which includes applying a hash function to an input value which includes information extracted from the packet, and performing lookup operation in a hash table based on the hash key to generate a second validation result.

2. Description

Disclosed are, inter alia, methods, apparatus, computer-storage media, mechanisms, and means associated with pattern matching values of a packet. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Disclosed are, inter alia, methods, apparatus, computer-storage media, mechanisms, and means associated with pattern matching values of a packet which may result in a false-positive match. One embodiment includes a method, comprising: determining, by a packet switching device, a packet matches one of a plurality of predetermined patterns which allow for false-positive matching indications of a plurality of underlying rules corresponding to the plurality of predetermined patterns. In one embodiment, said determining the packet matches one of the plurality of predetermined patterns includes: determining a first pattern match of a packet when each particular portion of a plurality of different portions of the packet is found to be matching a corresponding particular pattern portion by performing a table lookup operation based on the particular portion as an address in a corresponding different current portion-iteration table to retrieve a corresponding partial result.

One embodiment includes filtering the first pattern match using a second validation technique for removing false-positive first pattern matches to produce a false-positive filtered pattern match. One embodiment includes updating the packet switching device based on the false-positive filtered pattern match. One embodiment includes processing the packet based on the false-positive filtered pattern match. In one embodiment, each of the plurality of different portions are within a payload of the packet. In one embodiment, the second validation technique includes: producing a hash key which includes applying a hash function to an input value which includes information extracted from the packet, and performing a lookup operation in a hash table based on the hash key to generate a second validation result. In one embodiment, said information includes each of the plurality of different portions of the packet. One embodiment includes after said determining the first pattern match of the packet matches and said filtering the first pattern match using a second validation technique, post-processing to determine that there is no false positive. In one embodiment, said determining a first pattern match produces a false positive match for the packet. In one embodiment, the false-positive filtered pattern match does not include the false positive match for the packet. In one embodiment, the plurality of different portions consists of no more than sixteen portions. In one embodiment, the plurality of different portions consists of no more than four portions totaling no more than eight bytes. In one embodiment, the second validation technique includes confirming that a payload of the packet is within a range of predetermined lengths corresponding to the first pattern match. In one embodiment, said determining the packet matches one of the plurality of predetermined patterns includes pre-filtering the packet to confirm that it conforms to a set of characteristics for which there is a possible match. In one embodiment, said determining the packet matches one of the plurality of predetermined patterns includes pre-filtering the packet to confirm that it is of a predetermined protocol type.

One embodiment includes a packet switching device, comprising: one or more processors; memory; a plurality of interfaces configured to send and receive packets; and one or more packet switching mechanisms configured to packet switch packets among said interfaces. In one embodiment, said packet switching device is configured to perform operations, including: determining, by a packet switching device, a packet matches one of a plurality of predetermined patterns, wherein said determining the packet matches one of the plurality of predetermined patterns includes: determining a first pattern match of a packet when each particular portion of a plurality of different portions of the packet is found to be matching a corresponding particular pattern portion by performing a table lookup operation based on the particular portion as an address in a corresponding different current portion-iteration table to retrieve a corresponding partial result.

In one embodiment, said operations comprise filtering the first pattern match using a second validation technique for removing false-positive first pattern matches to produce a false-positive filtered pattern match.

One embodiment includes a method, comprising: determining, by a packet switching device, whether a payload of each particular packet of a plurality of packets matches one of a plurality of predetermined patterns which allow for false-positive matching indications of underlying rules corresponding to the plurality of predetermined patterns. In one embodiment, said determining for said particular packet includes: performing a plurality of memory lookup operations identifying a current matching state for each particular portion of a plurality of portions of the payload of said particular packet based on said particular portion as an address for a current memory lookup operation of the plurality of memory lookup operations. One embodiment includes performing a second validation check to remove a possible false-positive matching indication for said particular packet in response to said particular packet being identified as matching one of the plurality of predetermined patterns. In one embodiment, the second validation check includes: producing a hash key which includes applying a hash function to an input value which includes information extracted from the packet, and performing lookup operation in a hash table based on the hash key to generate a second validation result.

FIG. 1 illustrates a network 100 operating according to one embodiment. Shown are two packet switching devices 104 and 106 and an interconnecting network 105, including a plurality of packet switching devices. In communicating a packet, a packet switching device 104, 105, 106 (e.g., router) often will classify a packet, including, but not limited to, based on a portion of the payload of a packet. One embodiment allows for fast Layer 7 characterization by performing a small number of pattern matches. However, this small amount of pattern matching typically will allow for a false positive match of an underlying rule corresponding to the pattern matching. Techniques such as deterministic finite automaton (DFA) will produce a result with no false-positives, but such a technique often has a large search space and requires processing time that far exceeds the processing time of one embodiment disclosed herein.

Figure 2A:
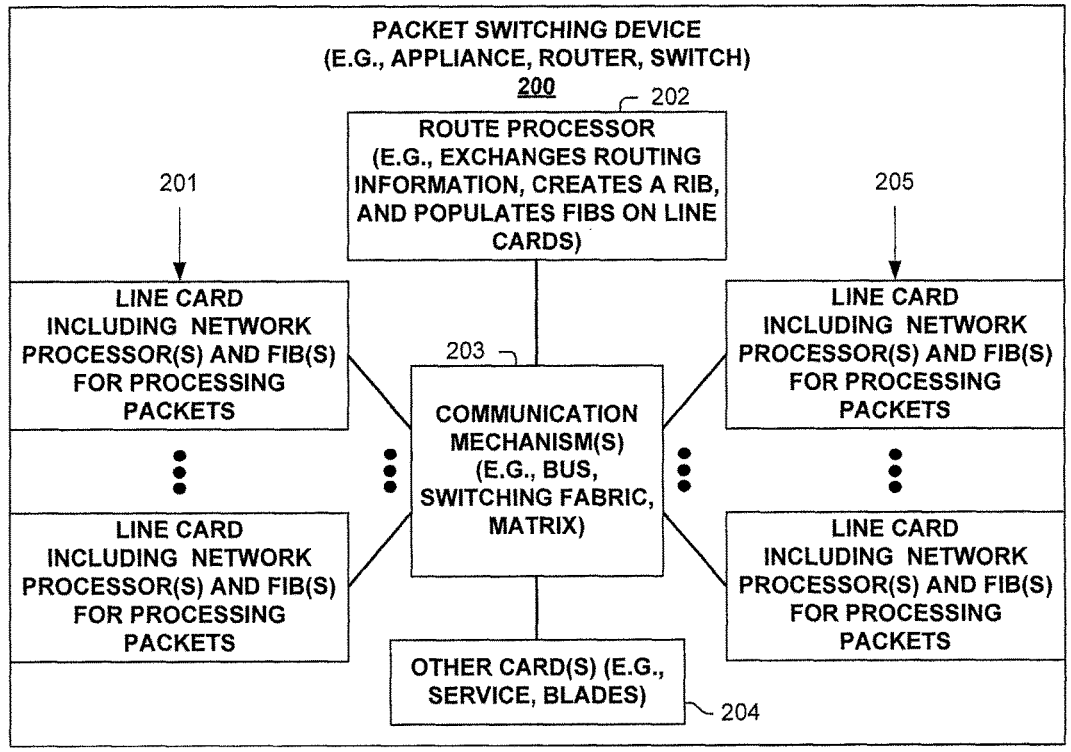
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with pattern matching values of a packet. Packet switching device 200 also has a control plane with one or more processing elements 202 for managing the control plane and/or control plane processing of packets associated with pattern matching values of a packet. Packet switching device 200 also includes other cards 204 (e.g., service cards, blades) which include processing elements that are used in one embodiment to process packets associated with pattern matching values of a packet, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 perform lookup operations on forwarding information bases (FIBs) to determine how to ingress and/or egress process packets. Even though the term FIB includes the word "forwarding," this information base typically includes other information describing how to process corresponding packets.

Figure 2B:
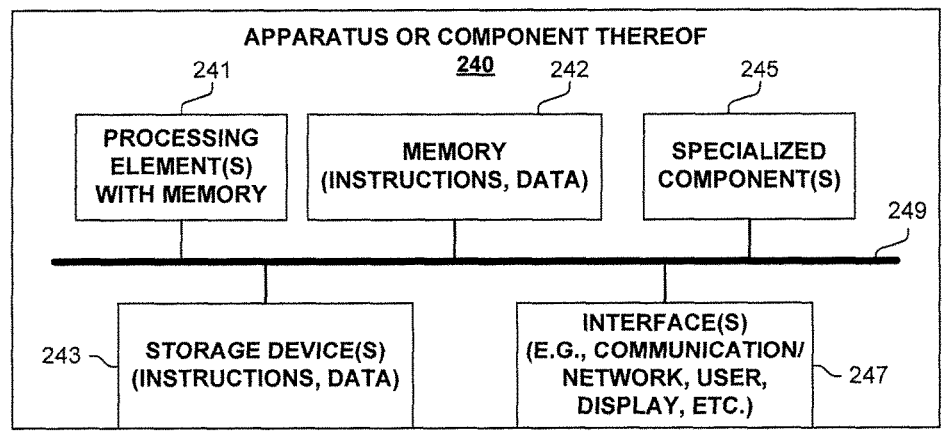
FIG. 2B illustrates an apparatus according to one embodiment.

FIG. 2B is a block diagram of an apparatus 240 used in one embodiment associated with pattern matching values of a packet. In one embodiment, apparatus 240 performs one or more processes, or portions thereof, corresponding to one of the flow diagrams illustrated or otherwise described herein, and/or illustrated in another diagram or otherwise described herein.

In one embodiment, apparatus 240 includes one or more processing element(s) 241 (typically with on-chip memory), memory 242, storage device(s) 243, specialized component(s) 245 (e.g. optimized hardware such as for performing lookup and/or packet processing operations, etc.), and interface(s) 247 for communicating information (e.g., sending and receiving packets, user-interfaces, displaying information, etc.), which are typically communicatively coupled via one or more communications mechanisms 249, with the communications paths typically tailored to meet the needs of a particular application.

Various embodiments of apparatus 240 may include more or fewer elements. The operation of apparatus 240 is typically controlled by processing element(s) 241 using memory 242 and storage device(s) 243 to perform one or more tasks or processes. Memory 242 is one type of computer-readable/computer-storage medium, and typically comprises random access memory (RAM), read only memory (ROM), flash memory, integrated circuits, and/or other memory components. Memory 242 typically stores computer-executable instructions to be executed by processing element(s) 241 and/or data which is manipulated by processing element(s) 241 for implementing functionality in accordance with an embodiment. Storage device(s) 243 are another type of computer-readable medium, and typically comprise solid state storage media, disk drives, diskettes, networked services, tape drives, and other storage devices. Storage device(s) 243 typically store computer-executable instructions to be executed by processing element(s) 241 and/or data which is manipulated by processing element(s) 241 for implementing functionality in accordance with an embodiment.

Figure 3:
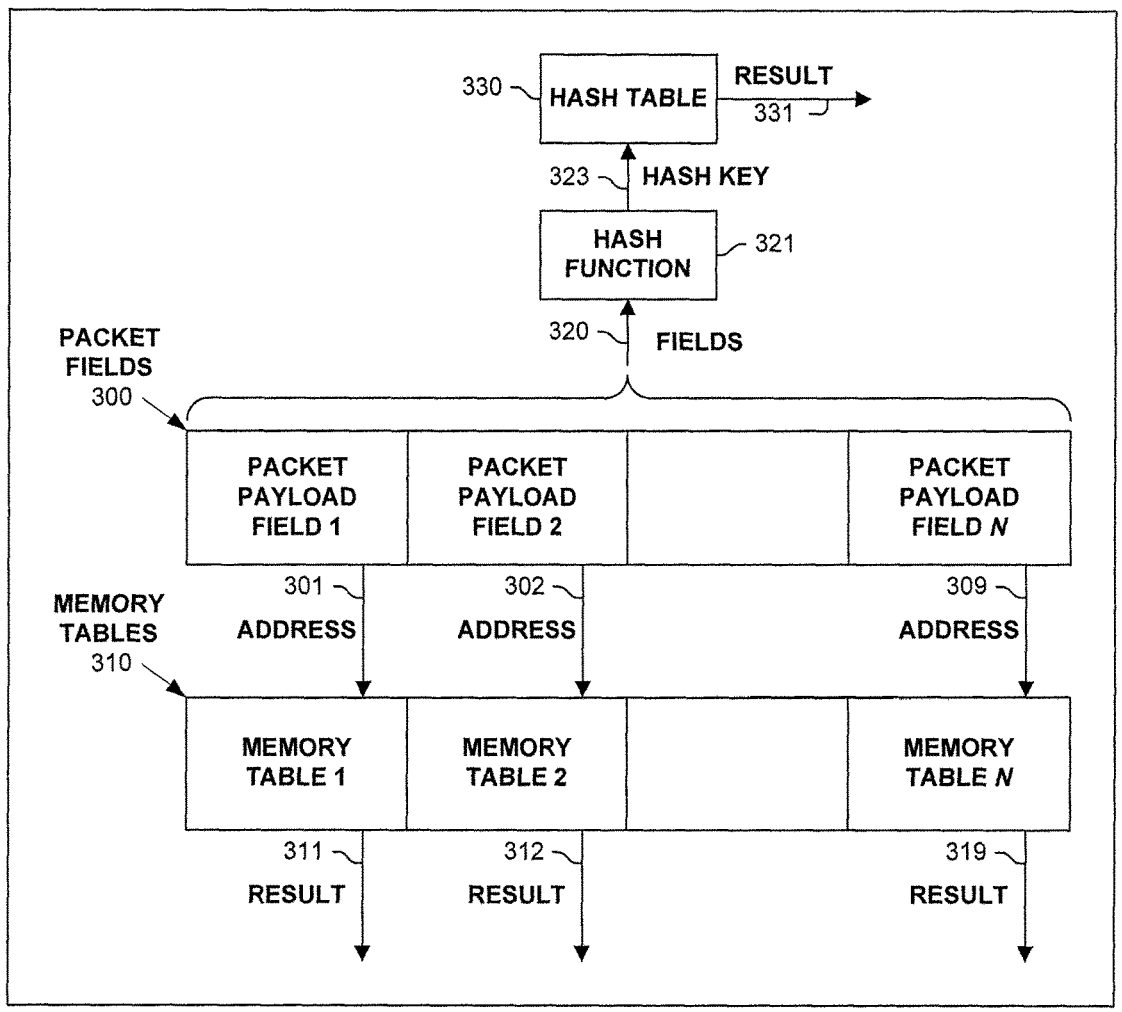
FIG. 3 illustrates a process according to one embodiment.

FIG. 3 illustrates a process performed by a packet switching device in one embodiment to determine whether a packet matches a predetermined rule. Shown in FIG. 3 are N packet fields 300, such as, but not limited to, fields extracted from a payload of a packet. Also shown in FIG. 3 are N memory tables 310. As shown, the N packet fields 300 are used as addresses (301-309) to perform memory lookup operations in N different memory tables 310 to retrieve results (311-319). In one embodiment, results 311-319 include indications of end of pattern, continue to match, and no match.

In one embodiment, results (311-319) are generated in a predetermined order (e.g., from first field 301/memory table 311, then second field 302/memory table 312 . . . ). If a result 311-319 is end of pattern, then a pattern has been matched and no further pattern matching lookup operations are required in memory tables 310. If a result 311-319 continues match, then the pattern matching proceeds with a next result being retrieved from a next memory table 310. If a result 311-319 is not matched, then there is no matching pattern and no further pattern matching lookup operations are required in memory tables 310.

In one embodiment, if the pattern matching results in a match, then a second validation is performed using values from the packet, and in one embodiment, at least one or more of packet fields 300 are used in performing the pattern matching. In one embodiment, a hash function 321 is applied to fields 320 (one or more of packet fields 300) to produce a hash key 323. In one embodiment, a cyclic redundancy check or checksum is used as hash function 321. Hash table 330 is then accessed using hash key 323 to generate second validation result 331. If result 331 is not a match, then the pattern matching resulted in a false-positive, which is then filtered by this second validation technique.

One embodiment is configured to classify applications corresponding to a packet (possibly in conjunction with other packets in a same packet flow) by matching a first N bytes, octets, or other portions to identify an application (e.g., a Layer 7 application). In one embodiment, a portion is two bytes, and each memory table has 64K memory locations. A corresponding update to the packet switching device is then accordingly made such as, but not limited to, accommodate the scheduling and/or Quality of Service requirements of the application, or possibly to police an application that is not allowed by dropping corresponding packets.

Figure 4:
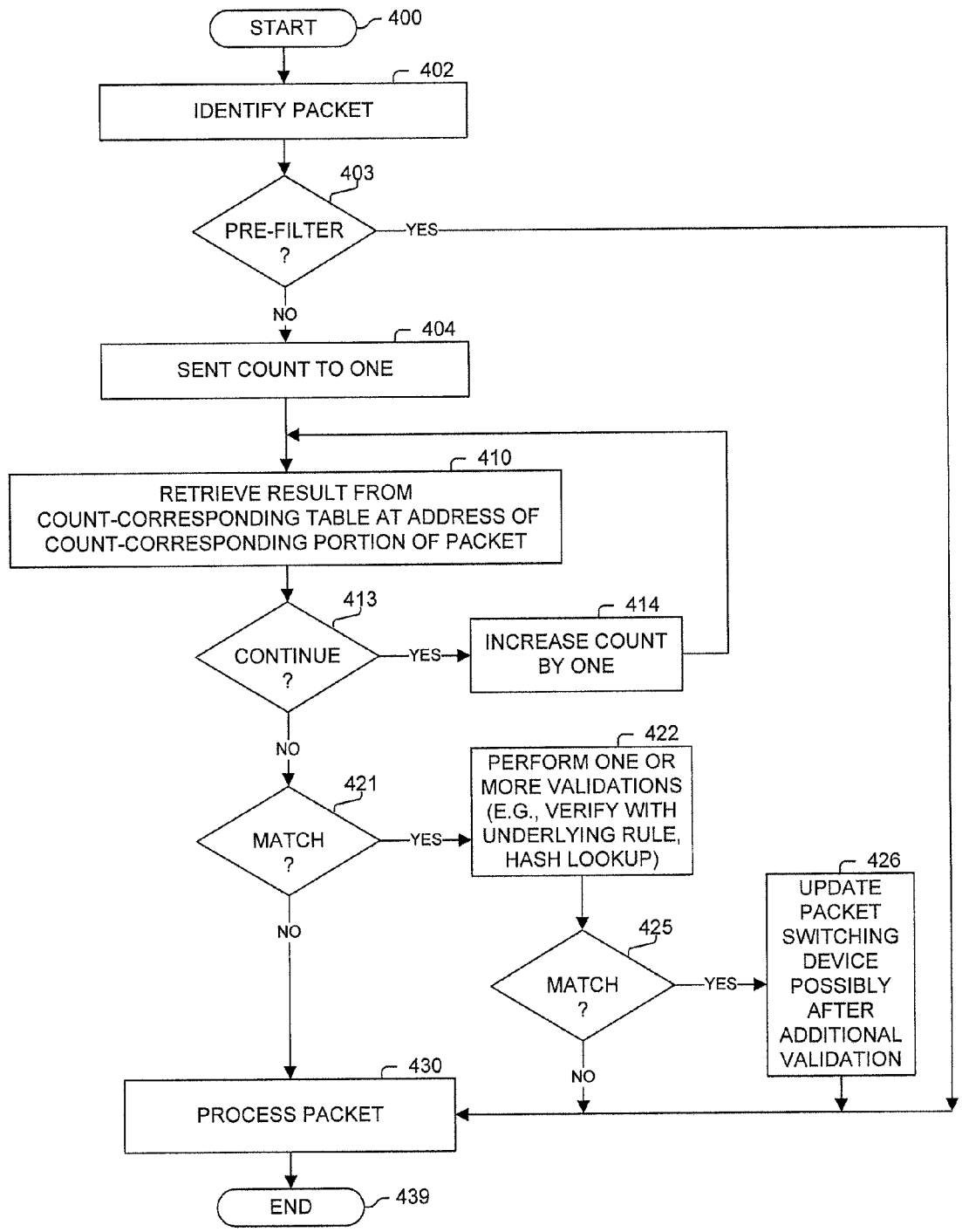
FIG. 4 illustrates processes according to one embodiment.

FIG. 4 illustrates a process performed in one embodiment. Processing begins with process block 400. In process block 402, a packet is identified (e.g., received, retrieved from a queue, created).

As determined in process block 403, if the packet is pre-filtered, then processing proceeds directly to process block 430; otherwise, processing proceeds to process block 404. One embodiment pre-filters packets based on one more characteristics of the packet, such as, but not limited to, pre-filtering all packets except User Datagram Protocol (UDP) packets, pre-filtering packets of predetermined packet or payload sizes.

Processing continues with process block 404 to perform the sequential pattern matching of one embodiment. In process block 404, count is set to one. In process block 410, a result is received from the count-corresponding memory table (e.g., first table, second table, . . . ) at the count-corresponding portion (e.g., first two bytes, second two bytes, . . . ). As determined in process block 413, if the retrieved result is to continue pattern matching, then in process block 414, count is increased by one, and processing returns to process block 410. In one embodiment, a maximum of one to thirty-two lookup operations is performed. In one embodiment, a maximum of four, eight or sixteen lookup operations is performed. In one embodiment, a maximum of more than thirty-two lookup operations is performed.

Otherwise process continues to process block 421 from process block 413 as the memory result from process block 410 was not to continue pattern matching. As determined in process block 421, if the memory result from process block 410 is not a match, then processing proceeds directly to process block 430; otherwise, processing proceeds to process block 422.

In one embodiment, the small number of pattern matching portion sizes and number of maximum iterations allows for false-positive results to be generated by the processing of process blocks 404, 410, 413, and 414. In process block 422, one or more validation checks are performed in one embodiment to filter some or all potential false positive matching results. In one embodiment, a hashing or other validation technique is used. In one embodiment, an underlying rule or characteristics thereof (e.g., a range of one or more sizes of matching payloads) corresponding to the match is retrieved and applied to the packet to determine whether a match remains. In one embodiment, if the pattern matching results in a match as determined in process block 421, then in process block 422, a range of corresponding payload lengths is retrieve and compared against the size of the packet's payload. Additionally in one embodiment, a hashing or other validation check is further performed in process block 422 after confirming that the payload size matches.

As determined in process block 425, if after the validation of process block 422 there remains a match, then in process block 426, the packet switching device is updated accordingly; else processing proceeds directly to process block 430. In one embodiment, process block 426 includes sending the packet (or a copy thereof) to another processing subsystem to perform a complete validation that has no false positives.

In process block 430, the packet is processed (e.g., manipulated, dropped, scheduled, forwarded) by the packet switching device according to its current configuration. Processing of the flow diagram of FIG. 4 is complete as indicated by process block 439.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   receiving, by a packet switching device, a packet including a received payload;
   determining an application of said received packet, with said determining including performing independent lookup operations on each of a plurality of different portions of the received payload of said received packet resulting in the determination of a first pattern match result, that is a false or non-false match of a predetermined rule, and identifying the application based on the first pattern match result, with the first pattern match result being a false match; and
   processing said received packet based on said identified application;
   wherein said performing independent lookup operations includes for each particular portion of the plurality of different portions of the received payload of said received packet: retrieving from an entry located at a position of a value of said particular portion in the received payload of said received packet in a corresponding particular memory table of a plurality of memory tables to retrieve a corresponding partial result, with each corresponding particular memory table being different for each of the plurality of different portions; and
   wherein the application is an application-layer application.

2. The method of claim 1, comprising applying a second validation technique for removing a false match.

3. The method of claim 2, wherein the second validation technique includes: producing a hash key which includes applying a hash function to an input value which includes information extracted from said received packet, and performing a lookup operation in a hash table based on the hash key to generate a second validation result.

4. The method of claim 3, wherein said information includes the values of each of the plurality of different portions of the received payload.

5. The method of claim 2, comprising after said determining the first pattern match result and said applying the second validation technique, post-processing to determine validity of a false match.

6. The method of claim 2, wherein the plurality of different portions consists of no more than sixteen portions.

7. The method of claim 2, wherein the plurality of different portions consists of no more than four portions totaling no more than eight bytes.

8. The method of claim 2, wherein the second validation technique includes determining whether the received payload of said received packet is within a range of predetermined lengths corresponding to the first pattern match result.

9. The method of claim 1, wherein said identifying the application of said received packet includes pre-filtering said received packet to confirm that it conforms to a set of characteristics for which there is a possible match.

10. The method of claim 1, wherein said identifying the application of said received packet includes pre-filtering said received packet to confirm that it is of a predetermined protocol type.

11. A packet switching device, comprising:
    one or more processors;
    memory;
    a plurality of interfaces that send and receive packets; and
    one or more packet switching mechanisms that packet switch packets among said interfaces;
    wherein said packet switching device performs operations, including:
    receiving a packet including a received payload;
    determining an application of said received packet, with said determining including performing independent lookup operations on each of a plurality of different portions of the received payload of said received packet resulting in the determination of a first pattern match result, that is a false or non-false match of a predetermined rule, and identifying the application based on the first pattern match result, with the first pattern match result being a false match; and
    processing said received packet based on said identified application;
    wherein said performing independent lookup operations includes for each particular portion of the plurality of different portions of the received payload of said received packet: retrieving from an entry located at position of a value of said particular portion in the received payload of said received packet in a corresponding particular memory table of a plurality of memory tables to retrieve a corresponding partial result, with each corresponding particular memory table being different for each of the plurality of different portions; and wherein the application is an application-layer application.

12. The packet switching device of claim 11, wherein said operations comprise applying a second validation technique for removing a false match.

13. The packet switching device of claim 11, wherein said operations include updating scheduling, Quality of Service requirements, or policing of the application in response to said determined application.

14. The method of claim 1, comprising updating scheduling, Quality of Service requirements, or policing of the application in the packet switching device in response to said determined application.

* * * * *